United States Patent [19]
Miller et al.

[11] Patent Number: 5,663,832
[45] Date of Patent: Sep. 2, 1997

[54] DEVICE FOR AND METHOD OF REAL-TIME SIMULATION OF ATMOSPHERIC EFFECTS ON AN IMAGE

[76] Inventors: Walter B. Miller, 1814 Koree Ct.; Jennifer C. Ricklin; Mikhail A. Vorontsov, both of 1892 Buchanan Ave., all of Las Cruces, N. Mex. 88001

[21] Appl. No.: 401,483

[22] Filed: Mar. 3, 1995

[51] Int. Cl.$^6$ .............. G02B 27/46; G02F 1/29; G02F 1/01; G02F 1/1335

[52] U.S. Cl. .............. 359/559; 359/316; 359/240; 349/17; 349/25

[58] Field of Search .............. 359/558, 559, 359/36, 316, 111, 337, 338, 339, 341, 346; 348/750, 758; 382/210, 255, 260, 264; 356/124.5

[56] References Cited

U.S. PATENT DOCUMENTS

| | | | |
|---|---|---|---|
| 4,707,077 | 11/1987 | Marom | 350/162.12 |
| 5,046,824 | 9/1991 | Pepper | 359/72 |
| 5,048,935 | 9/1991 | Efron et al. | 359/36 |
| 5,071,231 | 12/1991 | Armitage et al. | 359/53 |
| 5,083,854 | 1/1992 | Zampolin et al. | 359/40 |
| 5,090,795 | 2/1992 | O'Meara et al. | 359/240 |
| 5,206,674 | 4/1993 | Puech et al. | 353/122 |
| 5,229,872 | 7/1993 | Mumola | 359/40 |

OTHER PUBLICATIONS

Vorontsov et al, "Intelligent laser systems: adaptive compensation of phase distortions in nonlinear system with two-dimensional feedback", SPIE vol. 1409 Nonlinear Optics, 1991, pp. 260–266.

Vorontsov et al, "Controlling transverse-wave interactions in nonlinear optics: generation and interaction of spatio-temporal structures," J. Opt. Soc, Am. B. vol. 9, No. 1, Jan. 1992, pp. 78–90.

J.C. Ricklin, et al "Turbulent Phase Screen for Study of Imaging System Performance" Journal of Modern Optics (to appear).

Primary Examiner—Paul M. Dzierzynski
Assistant Examiner—Audrey Chang
Attorney, Agent, or Firm—Freda L. Krosnick; Frank J. Dynda

[57] ABSTRACT

The present invention discloses a device for and method of simulating an image in real time under turbulent atmospheric conditions. The present invention is realized by expanding a first laser beam using a microscope-objective and a first lens. The expanded light is then projected onto a first LCLV. Light reflecting from the first LCLV is filtered, focused onto a diaphram, polarized, and directed along a path that is around two meters in length. The light is then split into a first beam and a second beam. The first beam is focused onto an optical fiber bundle which is connected to the first LCLV. One end of the optical fiber bundle is rotated with respect to the other end. The second beam is projected upon a second LCLV. A second laser beam is expanded and projected onto a LCTV. The image is provided to the LCTV. The LCTV image is projected onto, and modulated by the second LCLV. The light reflecting from the second LCLV, which represents a simulation of the image under turbulent atmospheric conditions, is then displayed using a CCD camera.

20 Claims, 2 Drawing Sheets

DEVICE FOR AND METHOD OF REAL-TIME SIMULATION OF ATMOSPHERIC EFFECTS ON AN IMAGE

TECHNICAL FIELD OF THE INVENTION

The present invention pertains to image or optical processing and, more particularly, to a device for and method of simulating, in real-time, the effects of atmospheric turbulence on an image.

BACKGROUND OF THE INVENTION

The influence of atmospheric-induced phase distortion on imaging has traditionally been studied through theoretical determinations of an optical turbulence modulation transfer function (MTF). The MTF for optical turbulence is defined only for very long (i.e., slow) or very fast (i.e., short) exposure time intervals, and is of limited use for real-time simulation of optical turbulence effects on imaging. Typically, digital simulation of optical turbulence effects is accomplished by theoretically estimating the MTF for turbulence, and then multiplying a specialized representation of this MTF with the two-dimensional Fourier transform of an input digital image. The truncated result is then inverse Fourier transformed to show a long-exposure (i.e., blurred) image similar to what would be seen with a long-exposure snapshot. Direct simulation of atmospheric effects on imaging system performance is computationally intense. The ability to simulate the statistical behavior of optical turbulence effects in real-time is a major problem that the present invention solves.

The present invention uses optical techniques, rather than digital techniques, to introduce dynamic spatio-temporal chaotic phase distortions into a computer-generated image. Many of the difficulties associated with digital simulation are overcome by the present invention. The present invention also offers a cost-effective, and efficient, device for and method of determining how imaging systems will operate under realistic atmospheric conditions.

The present invention uses a modified optical kaleidoscope. The conventional optical kaleidoscope was developed under the direction of Prof. Mikhail A. Vorontsov at Moscow State University. The details of the optical kaleidoscope are disclosed in an article by Prof. Vorontsov and A. V. Larichev entitled "Intelligent laser systems: adaptive compensation of phase distortions in nonlinear system with two-dimensional feedback," SPIE Vol. 1409 Nonlinear Optics, 1991, pp. 260–266, and by Prof. Vorontsov, S. A. Akhmanov, V. Yu. Ivanov, A. V. Larichev, and N. I. Zheleznykh in an article entitled "Controlling transverse-wave interactions in nonlinear optics: generation and interaction of spatio-temporal structures," in J. Opt. Soc. Am. B, Vol. 9, No. 1, January 1992, pp. 78–90. The present invention uses a modified optical kaleidoscope that exhibits stronger diffraction in the optical feedback path then does the conventional optical kaleidoscope. The modified optical kaleidoscope enables one to simulate pattern disintegration with the corresponding transition to well-developed spatio-temporal chaos.

U.S. Pat. No. 4,707,077, entitled REAL TIME IMAGE SUBTRACTION WITH A SINGLE LIQUID CRYSTAL LIGHT VALVE, discloses a device for subtracting one image from another image in real time using a liquid-crystal light-valve (LCLV). The present invention adds one image to another image in real time using a LCLV where the added image is a simulation of atmospheric turbulence created by a modified optical kaleidoscope. U.S. Pat. No. 4,707,077 does not disclose a device for adding an image to another image and does not disclose a device for simulating atmospheric turbulence as the present invention does.

U.S. Pat. No. 5,206,674, entitled SYSTEM FOR THE DISPLAY OF IMAGES GIVEN BY A SPATIAL MODULATOR WITH TRANSFER OF ENERGY, discloses a device for displaying an image on a wide screen liquid-crystal video display. The present invention displays an image but not necessarily on a wide-screen display. U.S. Pat. No. 5,206,674 does not disclose a device for adding simulated atmospheric turbulence to an image as the present invention does.

U.S. Pat. No. 5,229,872, entitled EXPOSURE DEVICE INCLUDING AN ELECTRICALLY ALIGNED ELECTRONIC MASK FOR MICROPATTERNING, discloses a device for and method of using a LCLV to direct an electron beam to produce microscopic patterns on a semiconductor substrate. The present invention uses LCLVs to simulate atmospheric turbulence and add said turbulence to another image. U.S. Pat. No. 5,229,872 does not disclose a device for or method of adding simulated atmospheric turbulence to an image as the present invention does.

U.S. Pat. No. 5,083,854, entitled SPATIAL LIGHT MODULATOR WITH IMPROVED APERTURE RATIO, discloses a device for and method of using a LCLV to magnify an image in segments while preserving spatial boundaries between adjacent magnified segments. The present invention uses LCLVs to project images but not to magnify them. U.S. Pat. No. 5,083,854 does not disclose a device for or method of adding simulated atmospheric turbulence to an image as the present invention does.

U.S. Pat. No. 5,071,231, entitled BIDIRECTIONAL SPATIAL LIGHT MODULATOR FOR NEURAL NETWORK COMPUTERS, discloses a device for adding two images. The present invention adds two images where one of the two images is a simulation of atmospheric turbulence. U.S. Pat. No. 5,071,231 does not disclose a device for adding simulated atmospheric turbulence to an image as the present invention does.

SUMMARY OF THE INVENTION

It is an object of the present invention to disclose a device for and method of simulating, in real-time, the effects of atmospheric turbulence on an image.

It is another object of the present invention to use a modified optical kaleidoscope to create an optical signal with more diffraction then that created by a conventional optical kaleidoscope.

It is another object of the present invention to combine the optical signal created by the modified optical kaleidoscope with an image from a computer to simulate, in real-time, the effects of atmospheric turbulence on an image.

The objectives of the present invention are met by a device that consists of a modified optical kaleidoscope and an imaging portion. The modified optical kaleidoscope contains a laser which is used as the source of light for creating artificial atmospheric turbulence. The laser light is expanded by a microscope-objective and a lens. The light beam from the microscope-objective and the lens is then reflected off of a LCLV. The reflected light is then diffracted via a loop containing a spatial filter, a diaphragm and a polarizer. The loop also contains an optical fiber bundle. The bundle is rotated to achieve non-local (large scale) interactions the output of the bundle is connected with the back of the LCLV to close the optical feedback loop. The result is a two-dimensional nonlinear feedback system for simulating atmospheric turbulence.

A beam splitter is used to direct the simulated atmospheric turbulence toward an imaging portion of the present invention. The imaging portion of the present invention contains a liquid-crystal television (LCTV) for allowing a user to input an image that is desired to be see under turbulent atmospheric conditions. The simulated atmospheric turbulence is directed toward a second LCLV while the input image is directed toward the other side of the second LCLV. The light reflected from the LCLV represents the combination of the input image and the simulated atmospheric turbulence. The combined signal is then directed toward a charged-coupled-device (CCD) screen so that the user can observe the image under simulated turbulent atmospheric conditions.

DETAILED DESCRIPTION

Figure 1:
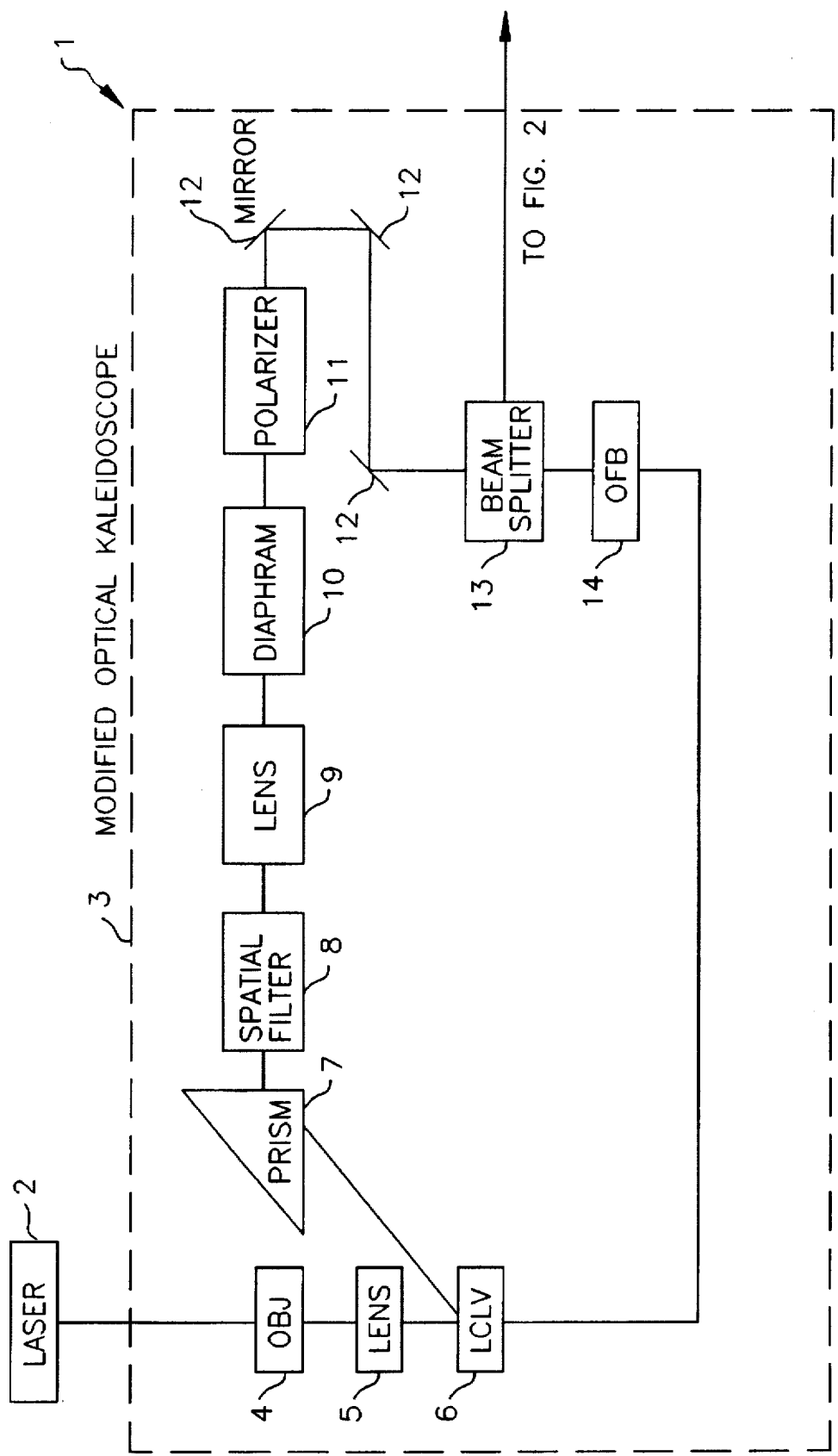
FIG. 1 a modified optical kaleidoscope schematic of a device for simulating the effects of atmospheric turbulence on an image in real-time.
Figure 2:
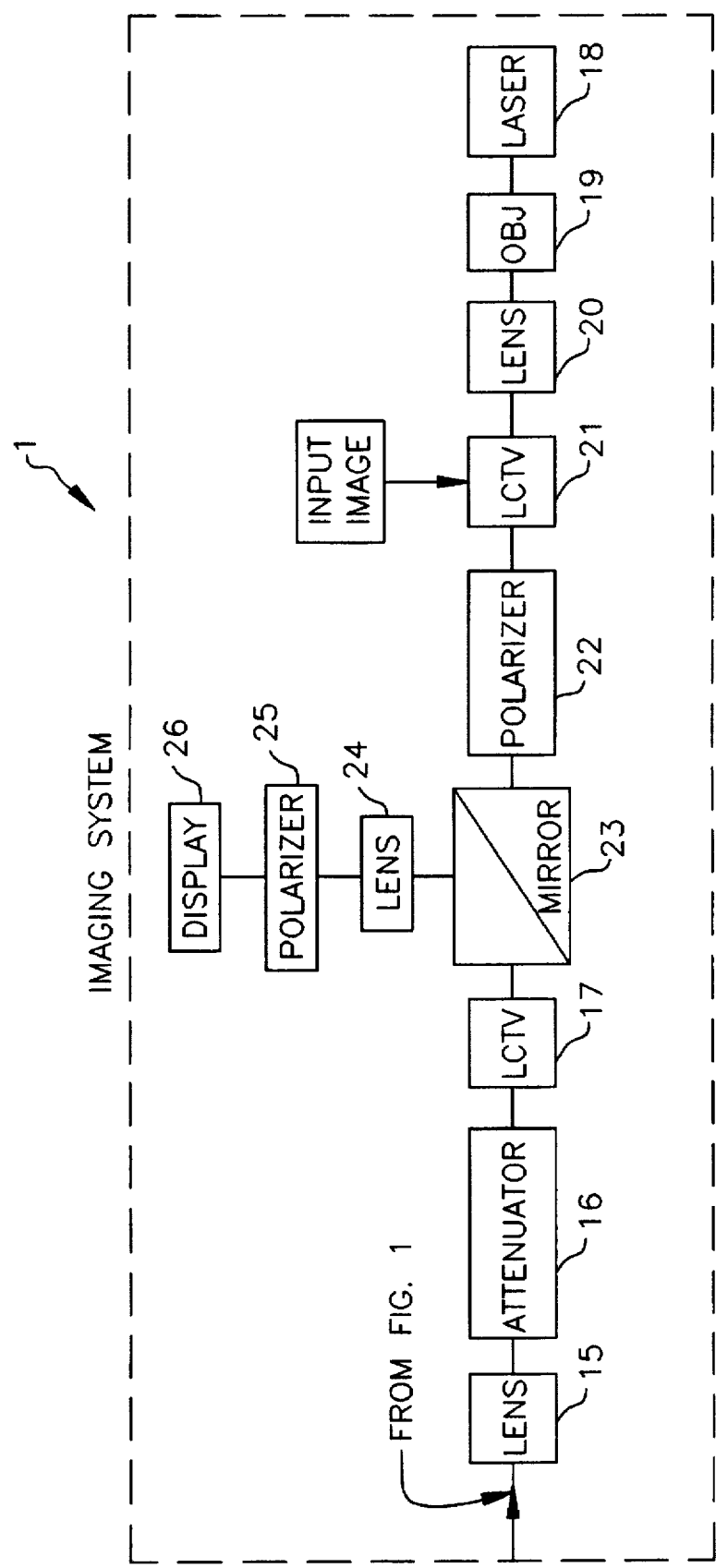
FIG. 2 is a imaging system schematic of a device for simulating the effects of atmospheric turbulence on an image in real-time.

FIGS. 1 and 2 depict a device 1 for simulating, in real-time, atmospheric effects on an image. As shown in FIG. 1, a laser 2 is used as the source of light that will be modulated to simulate turbulent atmospheric effects. This modulated signal will later be added to an image that is provided by a user. It is preferred that an Argon laser having a wave length of 514.5 nanometers and 100 milliwatts of power be used. The light from the laser 2 is then modulated by a modified optical kaleidoscope 3. The modified optical kaleidoscope 3 is a non-linear two-dimensional feedback system.

First, the light from the laser 2 is expanded to a diameter of twenty millimeters by passing the laser light through a microscope-objective 4 and a first lens 5. Light emanating from the microscope-objective 4 and the first lens 5 is then directed toward a first liquid-crystal light-valve (LCLV) 6. A conventional LCLV consists of a nematic liquid-crystal layer that is around ten microns thick, an internal mirror, an incident-light blocking layer, and a photoconductive layer. Such a conventional LCLV is preferred for all of the LCLVs used in the present invention.

The first LCLV 6 is tilted slightly so that the beam reflected from the first LCLV 6 is separated from the incident beam emanating from the microscope-objective 4 and the first lens 5. The reflected beam from the first LCLV is directed toward a prism 7. The prism 7 directs the reflected beam into an optical feedback loop. It is within this loop that nonlinear effects are added to the light beam of the laser 2.

The light from the prism 7 is passed through a spatial filter 8. Spatial filtering causes changes in the spatial scale of the atmospheric turbulence created by the modified optical kaleidoscope 3. The light from the spatial filter 8 is then directed toward a second lens 9. The second lens 9 has the same focal length and focal plane as the first lens 5. The light from the second lens 9 is then directed toward a diaphragm 10. The image on the liquid-crystal layer of the first LCLV 6 is formed on the plane of the diaphragm 10. The light from the diaphragm 10 is directed toward a first polarizer 11.

The laser beam emanating from the polarizer 11 contains some diffraction. To increase this diffraction, and to add nonlinearity, the light from the polarizer 11 is directed through an optical feedback loop. It is preferred that the length of the feedback loop be at least two meters in length. A series of mirrors 12 are used to obtain the desired length of the optical feedback loop. The light from these mirrors 12 is then directed toward a beam splitter 13. The beam splitter 13 is used to direct the light generated by the modified optical kaleidoscope 3 toward the image of interest. By combining the artificially created atmospheric turbulence created by the modified optical kaleidoscope 3 with the desired image, an image is obtained that is representative of how that image would look under turbulent atmospheric conditions.

One of the two light beams emanating from the beam splitter 13 is directed toward the plane of an optical fiber bundle (OFB) 14. The other end of the OFB 14 is connected to the back of the first LCLV 6. One end of the OFB 14 is rotated with respect to the other end of the OFB 14 by an angle theta. It is preferred that the value of theta be a value from zero to pi. The intensity distribution in the plane of the OFB 14 is rotated by theta when light enters the first LCLV 6. Rotating the optical field in the two-dimensional feedback loop creates non-local transverse interactions, and radically increases the spatio-temporal instability of the light of diffraction and these non-local transverse interactions, the field loses stability as it propagates through the optical feedback loop. This instability appears as spontaneous scintillations in the intensity of the light beam.

The second beam of the beam splitter 13 is directed toward a third lens 15, as shown in FIG. 2. The light from the third lens 15 is directed toward an attenuator 16. The light from the attenuator 16 represents the artificially created atmospheric turbulence which is to be added to a desired image to simulate how the image would look in turbulent atmospheric conditions. The light from the attenuator 16 is directed toward a second LCLV 17. The second LCLV 17 connects the modified kaleidoscope 3 to the imaging portion of the present invention. The second LCLV 17 serves to transform the chaotic intensity distribution from the feedback system into a corresponding phase modulation used in the imaging portion of the present invention.

The imaging portion of the present invention is comprised of a second laser 18. Preferably, the second laser 18 is a He—Ne laser. The light from the second laser 18 is expanded to a diameter of twenty millimeters by passing the laser light through a second microscope-objective 19 and a fourth lens 20. The light beam emanating from the second microscope-objective 19 and the fourth lens 20 is then directed toward a liquid-crystal television(LCTV) 21. Preferably, the LCTV 21 is computer-controlled so that various images can be created on its screen. But any two-dimensional digital or analog signal can be used as input to the present invention.

The LCTV 21 is the input device to the present invention that allows a user to specify the image that is desired to be simulated under turbulent atmospheric conditions. Light from the LCTV 21 is directed toward a second polarizer 22. Light from the second polarizer 22 is passed through a mirror 23 and directed toward the second LCLV 17. The light reflected from the second LCLV 17, which is modulated by the artificially generated atmospheric turbulence, is directed toward the mirror 23. The light reflected from the second LCLV 17 is modulated by the chaotic intensity pattern incident on the second LCLV 17. This phase modulation is proportional to the controlling intensity in the beam cross-section illuminating the second LCLV 17. The mirror 23 redirects the reflected light toward a fifth lens 24. The light from the fifth lens 24 is directed toward a third polarizer 25. The light from the polarizer 25 is directed toward a CCD screen 26 so that the user can see how the input image would look like under turbulent atmospheric conditions.

What is claimed is:

1. A device for simulating the effects of turbulent atmospheric conditions on an image, comprising:

a) a first laser;

b) a first microscope-objective disposed in the path of light emanating from said first laser;

c) a first lens disposed in the path of light emanating from said first microscope-objective for expanding the light emanating from said first laser to a width of around twenty millimeters;

d) a first LCLV disposed in the path of expanded light emanating from said first lens, where said first LCLV is tilted so that light reflecting from said first LCLV is separated from the light emanating from said first lens;

e) a prism disposed in the path of the reflected light from said first LCLV;

f) a spatial filter disposed in the path of light emanating from said prism;

g) a second lens disposed in the path of light emanating from said spatial filter, where said second lens has the same focal length as said first lens, where said second lens has a common focal plane with said first lens;

h) a diaphragm disposed in the path of light emanating from said second lens so that an image formed on said first LCLV is formed on the plane of said diaphragm;

i) a first polarizer disposed in the path of light emanating from said diaphragm;

j) a plurality of mirrors disposed in the path of light emanating from said first polarizer, where said plurality of mirrors is arranged so that an optical path of around two meters in length is formed;

k) a beam splitter disposed in the path of light emanating from said plurality of mirrors, for directing light which simulates turbulent atmospheric conditions without disturbing the path of the light;

l) an optical fiber bundle disposed in the path of the undisturbed light emanating from said beam splitter, having a first end of said optical fiber bundle rotated with respect to a second end of said optical fiber bundle, where said second end of said optical fiber bundle is connected to said first LCLV;

m) a third lens disposed in the path of directed light emanating from said beam splitter;

n) an attenuator disposed in the path of light emanating from said third lens;

o) a second LCLV disposed in the path of said attenuator, for projecting light that simulates atmospheric turbulence onto said second LCLV;

p) a second laser;

q) a second microscope-objective disposed in the path of light emanating from said second laser;

r) a fourth lens disposed in the path of light emanating from said second microscope-objective, for expanding the light emanating from said second laser to a width of around twenty millimeters;

s) an LCTV disposed in the path of light emanating from said fourth lens, having an input for accepting the image;

t) a second polarizer disposed in the path of light emanating from said LCTV;

u) a second mirror disposed in the path of light emanating from said second polarizer so that the light emanating from said second polarizer representing the image is passed through said second mirror onto said second LCLV so that light reflecting from said second LCLV represents the image modulated by simulated atmospheric turbulence and so that the light representing the image modulated by simulated atmospheric turbulence is redirected without disturbing the paths of light;

v) a fifth lens disposed in the path of the directed light of said second mirror;

w) a third polarizer disposed in the path of said fifth lens; and x) an optical display device disposed in the path of said third polarizer for displaying the image as modulated by turbulent atmospheric conditions.

2. The device of claim 1, wherein said first laser is a 100 milliwatt argon laser having a wave length of 514.5 nanometers.

3. The device of claim 1, wherein said first end of said optical fiber bundle is rotated with respect to the second end of said optical fiber bundle by an angle in the range from zero to pi radians.

4. The device of claim 1, wherein said second laser is a He—Ne laser.

5. The device of claim 1, further comprising a computer connected to the input of said LCTV for providing computer generated images to said LCTV.

6. The device of claim 1, wherein said optical display device is a CCD screen.

7. The device of claim 2, wherein said first end of said optical fiber bundle is rotated with respect to the second end of said optical fiber bundle by an angle in the range from zero to pi radians.

8. The device of claim 7, wherein said second laser is a He—Ne laser.

9. The device of claim 8, further comprising a computer connected to the input of said LCTV for providing computer generated images to said LCTV.

10. The device of claim 9, wherein said optical display is a CCD screen.

11. A method of simulating the effects of turbulent atmospheric conditions on an image, comprising the steps of:

a) providing a first laser beam;

b) expanding said first laser beam to a width of around twenty millimeters;

c) focusing the expanded beam of the previous step onto a first LCLV;

d) redirecting the light reflecting from said first LCLV using a prism;

e) filtering the light emanating from said prism;

f) focusing the filtered light of the previous step onto a diaphragm;

g) polarizing the light emanating from said diaphragm;

h) directing the polarized light of the previous step along a path that is around two meters in length;

i) splitting the light emanating from the previous step into a first beam and a second beam;

j) directing the first beam of the previous step onto a first end of an optical fiber bundle;

k) connecting the second end of said optical fiber bundle to said first LCLV;

l) rotating the first end of said optical fiber bundle with respect to the second end of said optical fiber bundle;

m) attenuating the second beam of step (i);

n) focusing the result of the previous step onto a second LCLV;

o) providing a second laser beam;

p) expanding the second laser beam to a width of around twenty millimeters;

q) focusing the expanded light of the previous step onto a LCTV;

r) providing the image to said LCTV;

s) polarizing the light emanating from said LCTV;

t) directing the polarized light of the previous step onto said second LCLV;

u) polarizing the light reflecting from said second LCLV; and v) displaying the polarized light of the previous step.

12. The method of claim 11, wherein said step of providing a first laser bean is accomplished by providing a first laser beam from a 100 milliwatt argon laser having a wave length of 514.5 nanometers.

13. The method of claim 11, wherein said step of rotating the first end of said optical fiber bundle with respect to the second end of said optical fiber bundle is accomplished by rotating the first end of said optical fiber bundle with respect to the second end of said optical fiber bundle by an angle in the range of from zero to pi radians.

14. The method of claim 11, wherein said step of providing a second laser beam is accomplished by providing a second laser beam from a He—Ne laser.

15. The method of claim 11, wherein said step of providing the image to said LCTV is accomplished by providing a computer image to said LCTV.

16. The method of claim 11, wherein said step of displaying the polarized light is accomplished by displaying the polarized light onto a CCD screen.

17. The method of claim 12, wherein said step of rotating the first end of said optical fiber bundle with respect to the second end of said optical fiber bundle is accomplished by rotating the first end of said optical fiber bundle with respect to the second end of said optical fiber bundle by an angle in the range of from zero to pi radians.

18. The method of claim 17, wherein said step of providing a second laser beam is accomplished by providing a second laser beam from a He—Ne laser.

19. The method of claim 18, wherein said step of providing the image to said LCTV is accomplished by providing a computer image to said LCTV.

20. The method of claim 19, wherein said step of displaying said polarized light reflecting from said second LCLV includes a further step of recording said polarized light reflecting from said second LCLV by displaying said polarized light reflecting from said second LCLV onto a CCD screen.

* * * * *